Patented Dec. 6, 1938

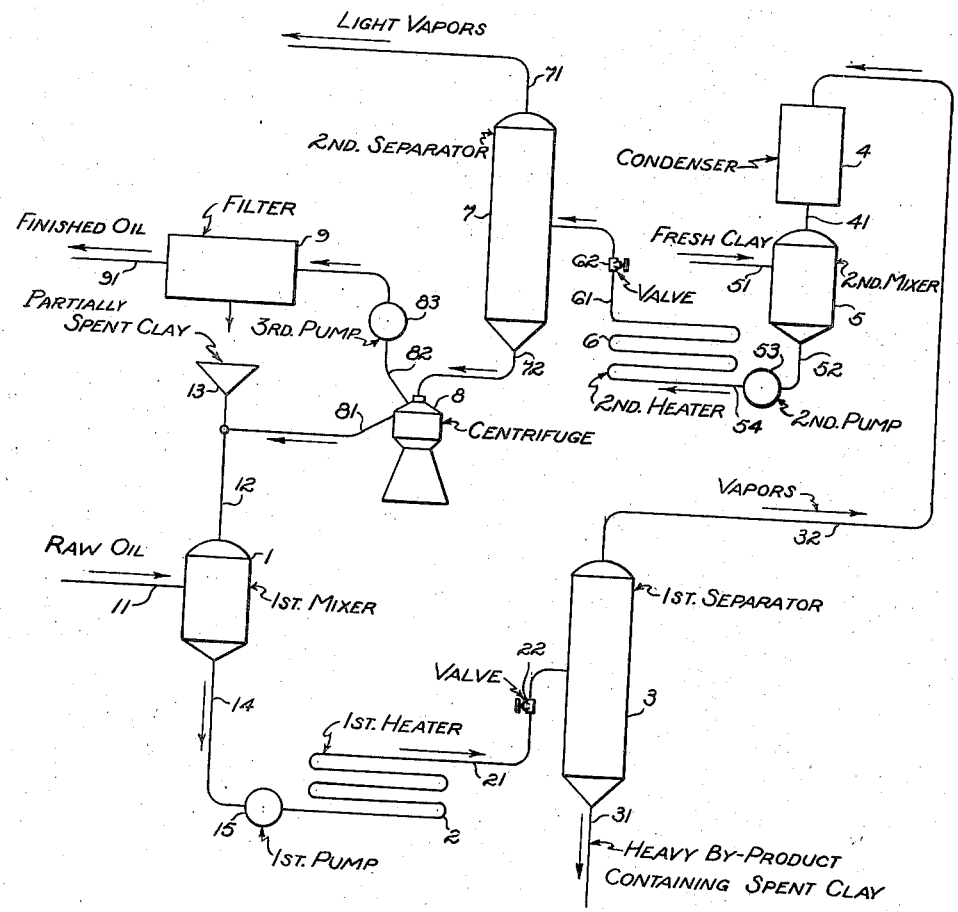

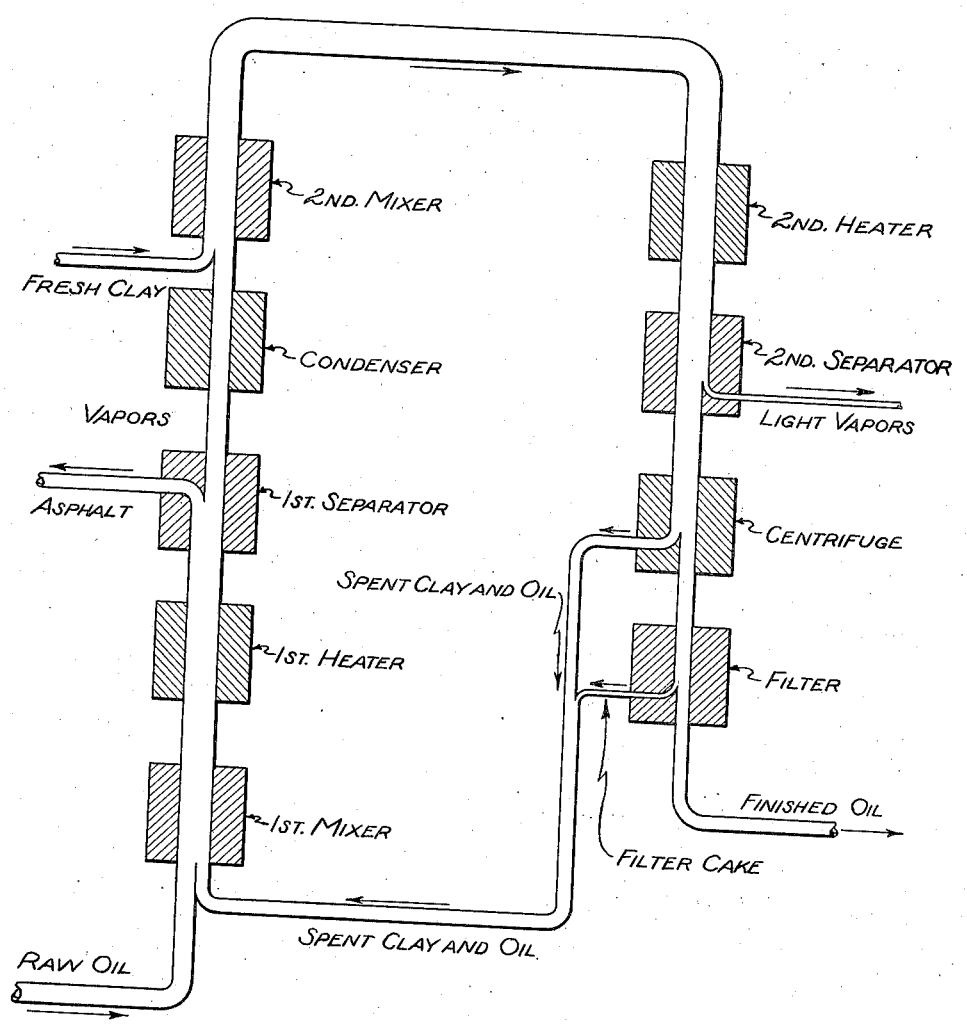

2,139,161

UNITED STATES PATENT OFFICE 2,139,161

PROCESS OF REFINING OIL

George Howard Hutchins, Hollywood, Calif., and Arthur W. Hartigan, New York, N. Y., assignors to Filtrol Company of California, Los Angeles, Calif., a corporation of California Application April 6, 1936, Serial No. 72,868

7 Claims. (Cl. 196—96)

Our invention relates to the refining of oils and is particularly applicable to oils which on refining yield a heavy residuum such, for example, as asphalt. The principal object of the invention is to produce from such oils a lighter oil of good color, for example, a lubricating oil.

There is a large sale in the United States for what is known as "Trinidad asphalt." This asphalt may be characterized by containing as much as 35% by weight of finely divided mineral matter of siliceous or argillaceous nature similar to clay. Such asphalt is valuable for various purposes and sells for a high price.

It is a further object of the invention to produce, as a by-product of the process, a material containing a large percentage of finely divided suspended solids, for example, clay, and to use certain crude oils to produce an asphalt somewhat similar to Trinidad asphalt.

In the production of oils, such, for example, as lubricating oils, it is desirable to produce clear oils free from color. To remove from the oils undesirable color and for the purpose of clarifying the oils it is common practice to use a decolorant such as fuller's earth, or acid activated clay or other finely divided adsorbents such as bone char and the like. The decolorant or adsorbent is commonly mixed with the oil and later removed therefrom by filtration. When so removed the adsorbent so separated as a filter cake retains a large proportion of oil which must either be removed by expensive solvent processes or wasted. In practice, due to the cost of solvent extraction, this retained oil is generally wasted.

It is a further object of our invention to provide a process in which there is no wastage of the finished oil due to its retention in the filter cake.

It is found in using many adsorbents that the material found in the filter cake still has considerable decolorizing efficiency, although not enough to warrant its re-use in decolorizing the oil product sought to be obtained, and it is a further object of the process to use the adsorbent in such a manner that any decolorizing efficiency in the adsorbent which remains after it has been once used to decolorize the finished oil, can be utilized. Since the adsorbent retains some of its decolorizing efficiency after its first use, it may be referred to as "partially spent" adsorbent, the adsorbent being considered as "completely spent" only after the second use.

Further objects and advantages will be made evident hereinafter.

Assembled apparatus suitable for practicing one embodiment of the invention is shown in Fig. 1 of the drawings forming a part of this specification. The drawing is merely diagrammatic since the exact details of any of the elements of this assembly are not important and suitable elements may now be purchased on the open market or readily constructed by anyone skilled in the art. A flow sheet is shown in Fig. 2 of the drawings.

The apparatus shown comprises the following main elements: 1 a first mixer, 2 a first heater, 3 a first separator, 4 a condenser, 5 a second mixer, 6 a second heater, 7 a second separator, 8 a centrifuge, and 9 a filter. With this apparatus are assembled certain other elements hereinafter described. All of these elements are not absolutely necessary to the proper operation of the process, but will be found very convenient.

The entire apparatus is assembled in the following manner: The first mixer is provided with a pipe 11 through which the oil to be refined is introduced into the mixer 1, this oil for convenience being called "raw" oil and it may be either crude oil or oil which has been previously treated. A pipe 12 conducts partially spent clay from a hopper 13 and sludge from the centrifuge 8 to the mixer 1, and a pipe 14 conducts liquid from the mixer 1 to a first pump 15 which pumps the liquid to the first heater 2.

Heated liquid passes from the first heater 2 through a pipe 21 having a valve 22 into the first separator 3. Heavy by-product is taken off from the bottom of the first separator by a pipe 31 and vapors are taken off by a pipe 32 and delivered to the condenser 4. The vapors are condensed in the condenser 4 and the condensates are delivered through a pipe 41 to the second mixer 5. Fresh clay is introduced into the second mixer 5 through a pipe 51 and liquid is delivered from the second mixer to a second pump 53 through a pipe 52. The second pump 53 delivers liquid under pressure through a pipe 54 to the second heater 6 from which it passes through a pipe 61 having a valve 62 to the second separator 7. Vapors are taken off from the second separator 7 through a pipe 71 and liquid is delivered from the second separator 7 to the centrifuge 8 through a pipe 72.

In the centrifuge 8 the oil delivered from the pipe 72 is separated into a heavy sludge containing substantially all the adsorbent and an oil containing little or no decolorant. The sludge is delivered through a pipe 81 to the pipe 12 or to the hopper 13, passing to the first mixer 1. The oil is delivered from the centrifuge 8 through a pipe 82 to the filter 9, a pump 83 providing the pressure necessary to drive the oil through the filter. Finished oil is delivered through the pipe 91 and filter cake from the filter 9 is dumped into the hopper 13. Suitable control and indicating devices, not shown or described, are supplied in such locations as to enable the operator to carry on the process now to be described.

The method of operation of the apparatus is as follows. Oil to be refined is delivered to the first mixer 1 through the pipe 11. For convenience we shall call this "unprocessed" oil since it may either be crude oil or an oil which has been previously treated. Althought the process is applicable to the refining of many types of oils, it is particularly applicable to an oil containing considerable asphalt and the following description will be limited to the operation of the process on that type of oil, without, of course, limiting the invention thereto. In the first mixer 1 the raw oil is mixed with partially spent clay delivered thereto through the pipe 12. This partially spent clay consists of clay which has been used in refining the final product mixed with a considerable proportion of oil similar to the final product. In the mixer the partially spent clay is thoroughly agitated and mixed with the unprocessed oil and due to the fact that it still has some decolorizing efficiency, this decolorizing efficiency is utilized during the mixing and during the subsequent heating. The mixture is then forced by the pump 15 through the heater 2 which can conveniently consist of a pipe coil heated by suitable means so that the oil is raised to a temperature at which substantially all of the constituents thereof will vaporize except the asphaltic residuum. This mixture is delivered through the pipe 21 into the first separator 3. A valve 22, or other suitable means for constricting the flow, is provided so that considerable super-atmospheric pressure may be placed on the oil in the heater 2, thus preventing excessive vaporization in the separator and improving the efficiency of separation. The first separator 3 may be of any convenient type suited to allow the oil vapors to escape from the oil, leaving a heavy asphaltic residuum and producing light vapors. The heavy asphaltum is called the "heavy by-product" and is delivered through the pipe 31 to suitable storage. This asphalt will contain substantially all of the clay which has been used in the process and will closely resemble Trinidad asphalt in its general characteristics.

The vapors which contain all of the volatile constituents are deivered through the pipe 32 to the condenser 4, which may be of any type suited to condense these vapors so that they are passed into the second mixer 5 through the pipe 41 in the form of a liquid. In the second mixer 5 the liquid is mixed with fresh adsorbent or clay delivered to the mixer through the pipe 51 or through a hopper in the top thereof. In the mixer the fresh clay is thoroughly mixed with the condensate from the condenser 4 and this condensate is forced by the second pump 53 through the second heater 6. This heater may also be conveniently made in the form of a pipe coil and the mixture delivered therefrom may be caused to flow against pressure exerted by the valve 62, or other suitable means, etc. In the heater 6 the mixture of clay and oil is raised to such a temperature that substantially all of the constituents thereof will vaporize except the oil which it is desired to produce as a finished product.

The mixture is delivered to the second separator 7 in which the vapors escape and are taken off through the pipe 71. These vapors may contain gasoline, kerosene, or other distillate which may be later condensed and saved.

The residuum from this distillation consists of the finished oil mixed with a considerable proportion of adsorbent or clay. This residuum is delivered through the pipe 72 to the centrifuge 8. This centrifuge is of a standard form and is of such construction that it tends to cause the heavy adsorbent to separate from the oil so that the adsorbent mixed with considerable oil issues from the centrifuge in the form of heavy sludge through the pipe 81. This heavy sludge is delivered to the pipe 12 or may be delivered into the hopper 13. It supplies the greater portion of the partially spent clay which is delivered through the pipe 12 to the first mixer 1. The centrifuge also delivers an oil which is substantially free from adsorbent. Inasmuch as it is necessary to separate substantially all of the decolorant from the oil, it may be advisable to provide the filter 9 through which the light cut from the centrifuge 8 is filtered, the pump 83 providing the necessary pressure for this operation. In the filter 9 the last traces of adsorbent are removed from the oil and the finished oil is delivered through the pipe 91. The partially spent clay produced in the form of a filter cake in the filter 9 is then dumped into the hopper 13 and mixed with the heavy sludge delivered from the pipe 81, and passes back into the first mixer.

Due to the fact that most of the color imparting impurities remain in the asphalt delivered through the pipe 31, the condensate delivered to the second mixer 5 from the pipe 41 is comparatively free from such impurities. By mixing fresh adsorbent with this condensate further objectionable color is removed by the action of the adsorbent on the oil, and the mixture delivered to the centrifuge 8 consists of decolorized oil carrying decolorant in suspension. In the centrifuge 8 this mixture is separated into a heavy sludge, which is delivered to the first mixer 1, and finished oil containing traces of the adsorbent, which is filtered in the filter 9. The filter cake produced in the filter 9 contains considerable retained oil. Since the oil retained in the filter cake and the oil contained in the sludge are returned to the system in the first mixer 1, this oil is not lost, being distilled out of the spent adsorbent in the first separator 3 and passing off as a vapor through the pipe 32. The partially spent clay delivered to the first mixer 1 is carried over into the first separator and remains in the heavy product delivered through the pipe 31, being uniformly dispersed in this heavy by-product. If a California asphaltic base oil is being refined, the heavy product is an asphalt which is quite similar to Trinidad asphalt and brings a somewhat higher price than ordinary asphalt. The addition of the adsorbent, of course, increases the weight of the asphalt and the refiner, in effect, sells his spent clay at asphalt prices. Since many forms of satisfactory adsorbent can be purchased at a price less than asphalt, the refiner decolorizes his oil and makes a profit on his decolorant. Since he has no oil retention loss, the entire operation not only decolorizes his oil but yields him a profit.

The process is above described as applied to the production of a lubricating oil from an asphalt or mixed base crude oil. It has also many other uses. For example, the first separator may be a dephlegmator delivering several cuts, such as kerosene or gasoline. Any or all these cuts may be treated with a decolorant, and the partially spent clay with its retained oil returned to the system so that the retained oil is saved and the decolorant is carried in suspension in the residual oil of the first distillation. If the presence of the partially spent clay in the residual oil is objectionable, it can be filtered out, in which case the loss from retention of the oil in the filter cake is not serious since the oil so retained is a low value product.

The invention broadly comprises using an adsorbent to decolorize an oil which when finished has a high commercial value and after the decolorant has been so used, passing the decolorant into a refining process in which the oil retained in the decolorant is recovered.

While we have spoken of the finely divided adsorbent as a "decolorant", it is to be understood that decolorizing is only one of the functions performed by this material as it also tends to clarify, neutralize, and stabilize the oil to which it is applied, and in many cases its decolorizing action is not significant.

We claim as our invention:

1. A process of refining oil to produce as a commercially desirable by-product a composition of asphalt and spent adsorbent, said process comprising: mixing fresh finely divided adsorbent with incompletely processed oil in liquid phase; heating said mixture to a temperature at which vapors readily escape therefrom; removing vapors from the heated mixture; separating from said mixture completely processed oil, leaving a residuum of oil and partially spent adsorbent; mixing said residuum with unprocessed oil; heating this last mixture to a temperature at which vapors are released therefrom; separating the vapors from said mixture, leaving a residuum of oil and spent adsorbent as the required by-product; and condensing the last-mentioned vapors to produce said incompletely processed oil.

2. A process of refining oil to produce as a commercially desirable by-product a composition of asphalt and spent adsorbent, said process comprising: mixing finely divided adsorbent with incompletely processed oil in liquid phase; heating said mixture to a temperature at which vapors readily escape therefrom; separating vapors from the heated mixture; drawing off completely processed oil from the mixture, thereby leaving a residuum of oil and partially spent adsorbent; mixing said residuum with fresh unprocessed oil; heating the resultant mixture to a temperature at which vapors readily escape therefrom; drawing off vapors from said resultant mixture, thereby leaving a residuum of oil and spent adsorbent constituting the desired by-product; and condensing the last-mentioned vapors to provide said incompletely processed oil.

3. A continuous process of refining oil to produce as a commercially desirable by-product a composition of asphalt and spent adsorbent, said process comprising: mixing fresh finely divided adsorbent into a liquid stream of partially processed oil; subjecting the mixed stream to pressure and applying heat sufficient to release vapors therefrom; removing vapors from the heated mixture; separating from said stream a stream of completely processed oil free of the adsorbent, leaving a residual stream of oil mixed with partially spent adsorbent; combining said residual stream with a stream of unprocessed oil; heating this combined stream to a temperature at which vapors readily escape therefrom; separating from said combined stream a stream of vapor and a residual stream of oil mixed with spent adsorbent constituting the desired by-product; and condensing said vapor stream to provide the first-mentioned stream of partially processed oil.

4. A process of refining an oil, which comprises: heating the oil to a temperature of fractionation; fractionating the oil to produce a vapor and a residuum; condensing said vapor; thoroughly mixing finely divided adsorbent with said condensate to produce a residual mixture; heating the residual mixture to a temperature of fractionation; fractionating the residual mixture to produce a second vapor and a second residuum containing the finely divided adsorbent; separating finished oil substantially free from said finely divided adsorbent from said second residuum; and passing the remainder of said oil which contains said finely divided adsorbent to the oil that passes into the first-mentioned fractionation.

5. A method of producing a commercially usable mixture of asphalt and comminuted material and a purified and decolorized oil from an oil stock having a content of asphalt, comprising: mixing the oil stock with a used comminuted adsorbent material obtained from a later stage of the process; applying heat to the mixture of oil stock and adsorbent material to vaporize a light fraction from said asphalt, said comminuted adsorbent material remaining with said asphalt; treating said light fraction with fresh adsorbent material in a subsequent step; separating said last-named adsorbent material from the light fraction treated thereby and returning this last-named adsorbent to the first step of the process to be mixed with oil stock containing asphalt; and cooling each quantity of asphalt and adsorbent material after a light fraction has been vaporized therefrom.

6. A process of refining oil to produce as a commercially desirable by-product a composition of asphalt and spent adsorbent, said process comprising: mixing finely divided adsorbent with incompletely processed oil in liquid phase; holding said mixture at such temperature and for such time that said adsorbent will decolorize and purify said oil; removing completely processed oil from the mixture, thereby leaving a residuum of oil and partially spent adsorbent; mixing said residuum with fresh unprocessed oil; heating the resultant mixture to a temperature at which vapors readily escape therefrom; drawing off vapors from said resultant mixture, thereby leaving a residuum of oil and spent adsorbent constituting the desired by-product; and condensing the last-mentioned vapors to provide said incompletely processed oil.

7. A process of refining oil to produce as a commercially desirable by-product a composition of asphalt and spent adsorbent, said process comprising: mixing finely divided adsorbent with incompletely processed oil in liquid phase; holding said mixture at such temperature and for such time that said adsorbent will decolorize and purify said oil; removing completely processed oil from the adsorbent, thereby leaving a residuum consisting chiefly of partially spent adsorbent and such oil as may be entrained therewith; mixing said residuum with fresh unprocessed oil; heating the resultant mixture to a temperature at which vapors readily escape therefrom; drawing off vapors from said resultant mixture, thereby leaving a residuum of oil and spent adsorbent constituting the desired by-product; and condensing the last-mentioned vapors to provide said incompletely processed oil.

G. HOWARD HUTCHINS.
ARTHUR W. HARTIGAN.